US007480727B2

(12) United States Patent
Domschitz

(10) Patent No.: US 7,480,727 B2
(45) Date of Patent: Jan. 20, 2009

(54) METHOD AND DEVICES FOR IMPLEMENTING HIGHLY INTERACTIVE ENTERTAINMENT SERVICES USING INTERACTIVE MEDIA-STREAMING TECHNOLOGY, ENABLING REMOTE PROVISIONING OF VIRTUAL REALITY SERVICES

(75) Inventor: Peter Domschitz, Stuttgart (DE)

(73) Assignee: Alcatel, Paris (FR)

( * ) Notice: Subject to any disclaimer, the term of this patent is extended or adjusted under 35 U.S.C. 154(b) by 1081 days.

(21) Appl. No.: 10/636,556

(22) Filed: Aug. 8, 2003

(65) Prior Publication Data

US 2004/0064504 A1    Apr. 1, 2004

(30) Foreign Application Priority Data

Aug. 12, 2002    (EP)    ................................ 02360239

(51) Int. Cl.
*G06F 15/16*    (2006.01)
(52) U.S. Cl. ........................... 709/231; 709/218; 725/38
(58) Field of Classification Search ................. 709/203, 709/231, 218; 725/37, 38, 110, 40, 139, 725/87; 463/40; 345/850, 633, 419; 715/706
See application file for complete search history.

(56) References Cited

U.S. PATENT DOCUMENTS

| 6,057,856 | A  | * | 5/2000 | Miyashita et al. | ........... 345/633 |
| 6,195,090 | B1 | * | 2/2001 | Riggins, III | ................. 725/139 |
| 6,227,974 | B1 | * | 5/2001 | Eilat et al. | ..................... 463/40 |
| 6,721,952 | B1 | * | 4/2004 | Guedalia et al. | ............... 725/38 |
| 6,745,226 | B1 | * | 6/2004 | Guedalia | .................... 709/203 |

(Continued)

FOREIGN PATENT DOCUMENTS

WO    WO 98/57718 A1    12/1998

(Continued)

OTHER PUBLICATIONS

Doenges P K et al: "Audio/Video and synthetic graphics/audio for mixed media" Signal Processing. Image Communication, Elsevier Science Publishers. Amsterdam, NL, vol. 9, No. 4, May 1, 1997, pp. 433-463, XP004075338.

(Continued)

*Primary Examiner*—Jungwon Chang
(74) *Attorney, Agent, or Firm*—Sughrue Mion, PLLC

(57) ABSTRACT

The invention relates to a method for generating an interactive virtual reality with a network service using interactive media-streaming technology comprising the steps of establishing an action stream session comprising connection handling, quality of service handling, adapting the network environment by demanding network resources and control information, establishing media-streaming path from the service to the client and a user interaction control path in the reverse direction, controlling the network with respect to required quality of service, continuously, generating and transmitting individual media streams to the client (ASC) by embedding interaction into a virtual reality, and extracting and encoding a media stream at the service using a virtual reality description compressed motion picture stream, encoding and transmitting the user's interaction to the service, as well as de-coding and playing the individual media data stream at the client side. Further it relates to a Action Streaming Service, Action Streaming Client (ASC), Action Streaming Server (ASS), Action Streaming System, Action Stream, Action Streaming Session, Action Streaming Protocol, and Computer Software Products for generating an interactive virtual reality.

9 Claims, 4 Drawing Sheets

U.S. PATENT DOCUMENTS

| | | | |
|---|---|---|---|
| 6,795,972 B2* | 9/2004 | Rovira | 725/40 |
| 7,143,430 B1* | 11/2006 | Fingerman et al. | 725/87 |
| 2002/0046407 A1* | 4/2002 | Franco | 725/110 |
| 2003/0005439 A1* | 1/2003 | Rovira | 725/37 |
| 2003/0025722 A1* | 2/2003 | Cliff et al. | 345/700 |
| 2003/0063133 A1* | 4/2003 | Foote et al. | 345/850 |
| 2003/0120823 A1* | 6/2003 | Kim et al. | 709/310 |

FOREIGN PATENT DOCUMENTS

| WO | WO 00/11847 A1 | 3/2000 |
|---|---|---|

OTHER PUBLICATIONS

Huard J-F et al: "Realizing the MPEG-4 Multimedia Delivery Framework" IEEE Network, IEEE Inc. New York, US, vol. 12, No. 6, Nov. 1998, pp. 35-45, XP000873126.

"Multimedia Home Platform" 'Online!, Nov. 2001, pp. 1-12, XP002224935.

* cited by examiner

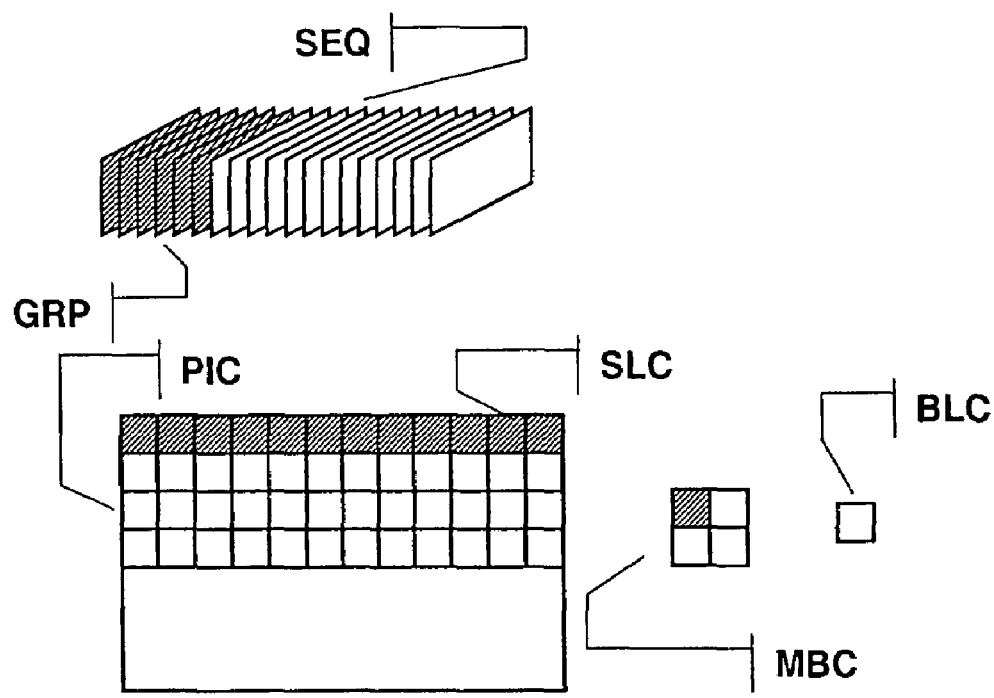
Prior Art Figure 1.
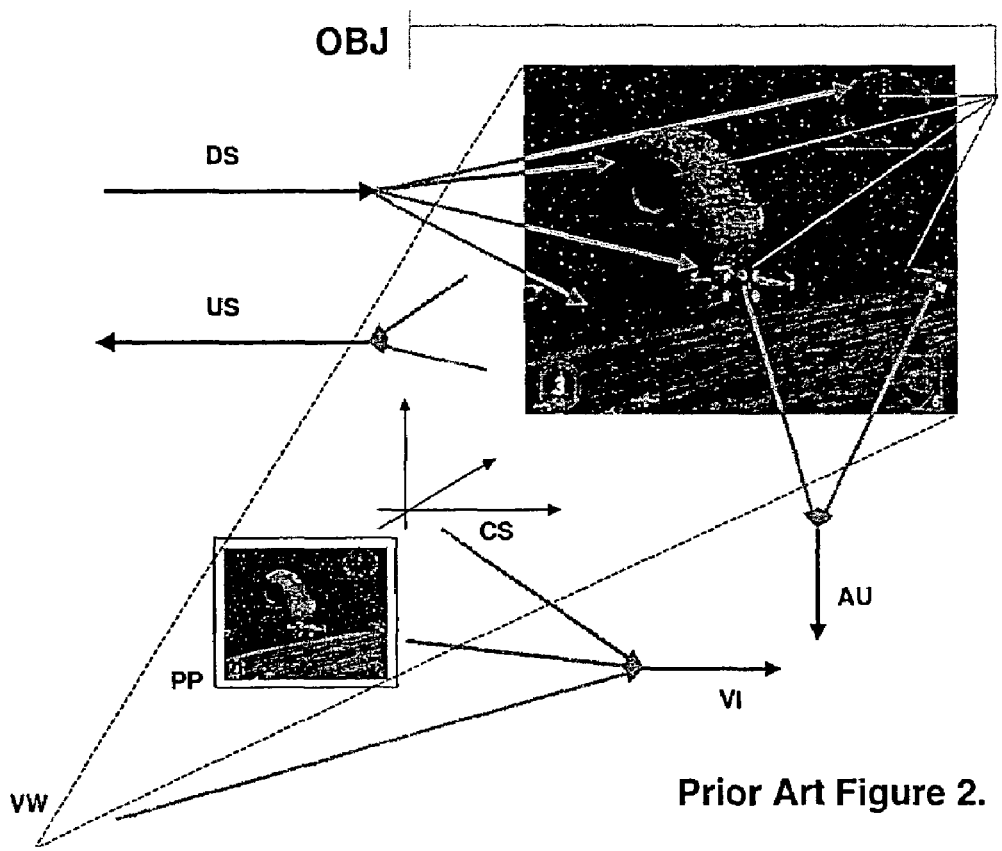
Prior Art Figure 2.

METHOD AND DEVICES FOR IMPLEMENTING HIGHLY INTERACTIVE ENTERTAINMENT SERVICES USING INTERACTIVE MEDIA-STREAMING TECHNOLOGY, ENABLING REMOTE PROVISIONING OF VIRTUAL REALITY SERVICES

BACKGROUND OF THE INVENTION

1. Field of the Invention

The present invention relates to the provisioning of highly interactive video/audio services, e.g. remote gaming, with reactive requirements and hard real-time conditions on required reactive and realistic dynamic visualization. More particularly, the present invention relates to a method, an action streaming service, an action streaming client, an action streaming server, an action streaming system, an action stream, an action streaming session, an action streaming protocol, and computer software products for generating an interactive virtual reality.

The invention is based on a priority application, EP 02360239.4, which is hereby incorporated by reference.

2. Background

The real-time video/audio processing for electronic gaming and other interactive virtual reality based entertainment requires specialized and performant local devices like high-end personal computers or game consoles.

There are multiple games for personal computers and consoles available allowing a plurality of player participating a (shared) game. The devices uses access network technology to share a virtual world. This is done using e.g. the Internet to exchange and align the virtual worlds. To minimize the consumed network resource a common used technique is to parameterize such virtual world.

For instance the virtual world of a soccer game is identified by the playing team and the location. The visualization of the location, i.e. the playground might be a part of the local game software itself. Hence the short string "WORLD CUP 2002 FINAL" specifies completely the players and the playground graphics. The state of the game could be specified by the orientation and position of the players and the ball. The classical distributed game architecture is to align these states via a network, e.g. the Internet, and generating the virtual reality, meaning the video and audio, locally at a game console comprising perspectives, models, and rendering. This approach avoids heavily interchanging data across the network.

The above architecture has been influenced by missing network resources, namely bandwidth or delay. In the future the situation will become slightly different. Digital video and audio is an emerging technology, deploying digital encoded audio and video streams. To support this kind of network applications, the European Telecommunications Standards Institute (ETSI) designed a standard platform, the Media Home Platform.

Media Home Platform

The Multimedia Home Platform (MHP) defines a generic interface between interactive digital applications and the terminals on which those applications execute. This interface de-couples different providers' applications from the specific hardware and software details of different MHP terminal implementations. It enables digital content providers to address all types of terminals ranging from low-end to high-end set top boxes, integrated digital TV sets and multimedia PCs. The MHP extends the existing, successful Digital Video Broadcast (DVB) standards for broadcast and interactive services in all transmission networks including satellite, cable, terrestrial, and microwave.

The architecture of the MHP is defined in terms of three layers: resources, system software and applications. Typical MHP resources are MPEG processing, I/O devices, CPU, memory and a graphics system. The system software uses the available resources in order to provide an abstract view of the platform to the applications. Implementations include an application manager (also known as a "navigator") to control the MHP and the applications running on it.

The core of the MHP is based around a platform known as DVB-J. This includes a virtual machine as defined in the Java Virtual Machine specification from Sun Microsystems. A number of software packages provide generic application program interfaces (APIs) to a wide range of features of the platform. MHP applications access the platform only via these specified APIs. MHP implementations are required to perform a mapping between these specified APIs and the underlying resources and system software.

The main elements of the MHP specification are:
MHP architecture (as introduced above),
definition of enhanced broadcasting and interactive broadcasting profiles,
content formats including PNG, JPEG, MPEG-2 Video/Audio, subtitles and resident and downloadable fonts,
mandatory transport protocols including DSM-CC object carousel (broadcast) and IP (return channel),
DVB-J application model and signaling,
hooks for HTML content formats (DVB-HTML application model and signaling),
DVB-J platform with DVB defined APIs and selected parts from existing Java APIs, JavaTV, HAVi (user interface) and DAVIC APIs,
security framework for broadcast application or data authentication (signatures, certificates) and return channel encryption (TLS),
graphics reference model.

The MHP specification provides a consistent set of features and functions required for the enhanced broadcasting and interactive broadcasting profiles. The enhanced broadcasting profile is intended for broadcast (one way) services, while the interactive broadcasting profile supports in addition interactive services and allows MHP to use the world-wide communication network provided by the Internet.

The MHP therefore is simply a common Application Program Interface (API) that is completely independent of the hardware platform it is running on. Enhanced Broadcasts, Interactive Broadcasts and Internet Content from different providers can be accessed through a single device e.g. Set top box or IDTV, that uses this Common DVB-MHP API.

It will enable a truly horizontal market in the content, applications and services environment over multiple delivery mechanisms (Cable, Satellite, Terrestrial, etc.).

Encoding Audio and Video Streams

Crucial for deploying interactive audio/video-streaming is encoding and decoding. In this area MPEG (pronounced M-peg), which stands for Moving Picture Experts Group, is the name of family of standards used for coding audio-visual information, e.g. movies, video, music in a digital compressed format. MPEG uses very sophisticated compression techniques.

MPEG-1 is a coding of moving pictures and associated audio for digital storage media at up to about 1.5 Mbit/s. It addresses the problem of combining one or more data streams from the video and audio parts of the MPEG-1 standard with timing information to form a single stream. This is an important function because, once combined into a single stream, the data are in a form well suited to digital storage or transmission.

It specifies a coded representation that can be used for compressing video sequences—both 625-line and 525-lines—to bit-rates around 1.5 Mbit/s. It was developed to operate principally from storage media offering a continuous transfer rate of about 1.5 Mbit/s. Nevertheless it can be used more widely than this because the approach taken is generic.

A number of techniques are used to achieve a high compression ratio. The first is to select an appropriate spatial resolution for the information. The algorithm then uses block-based motion compensation to reduce the temporal redundancy. Motion compensation is used for causal prediction of the current picture from a previous picture, for non-causal prediction of the current picture from a future picture, or for interpolative prediction from past and future pictures. The difference signal, the prediction error, is further compressed using the discrete cosine transform (DCT) to remove spatial correlation and is then quantised. Finally, the motion vectors are combined with the DCT information, and coded using variable length codes.

MPEG-1 specifies a coded representation that can be used for compressing audio sequences—both mono and stereo. Input audio samples are fed into the encoder. The mapping creates a filtered and sub-sampled representation of the input audio stream. A psycho-acoustic model creates a set of data to control the quantiser and coding. The quantiser and coding block creates a set of coding symbols from the mapped input samples. The block 'frame packing' assembles the actual bit-stream from the output data of the other blocks, and adds other information, e.g. error correction if necessary.

MPEG-2 describes a generic coding of moving pictures and associated audio information addresses the combining of one or more elementary streams of video and audio, as well as, other data into single or multiple streams which are suitable for storage or transmission. This is specified in two forms: the Program Stream and the Transport Stream. Each is optimized for a different set of applications. The Program Stream is similar to MPEG-1 Systems Multiplex. It results from combining one or more Packetized Elementary Streams (PES), which have a common time base, into a single stream. The Program Stream is designed for use in relatively error-free environments and is suitable for applications which may involve software processing. Program stream packets may be of variable and relatively great length.

The Transport Stream combines one or more Packetized Elementary Streams (PES) with one or more independent time bases into a single stream. Elementary streams sharing a common time-base form a program. The Transport Stream is designed for use in environments where errors are likely, such as storage or transmission in lossy or noisy media.

MPEG-2 builds on the powerful video compression capabilities of MPEG-1 to offer a wide range of coding tools. These have been grouped in profiles to offer different functionalities.

MPEG-2 Digital Storage Media Command and Control (DSM-CC) is the specification of a set of protocols which provides the control functions and operations specific to managing MPEG-1 and MPEG-2 bit-streams. These protocols may be used to support applications in both stand-alone and heterogeneous network environments. In the DSM-CC model, a stream is sourced by a Server and delivered to a Client. Both the Server and the Client are considered to be Users of the DSM-CC network. DSM-CC defines a logical entity called the Session and Resource Manager (SRM) which provides a (logically) centralized management of the DSM-CC Sessions and Resources.

MPEG-4 builds on the three fields: Digital television, Interactive graphics applications (synthetic content), and Interactive multimedia (World Wide Web, distribution of and access to content). MPEG-4 provides the standardized technological elements enabling the integration of the production, distribution and content access paradigms of the three fields.

The following sections illustrate the MPEG-4 functionalities described above, using the audiovisual scene depicted in FIG. 2.

Coded Representation of Media Objects

MPEG-4 audiovisual scenes are composed of several media objects, organized in a hierarchical fashion. At the leaves of the hierarchy, one find primitive media objects, such as:

Still images, e.g. as a fixed background,
  Video objects, e.g. a talking person—without the background,
  Audio objects, e.g. the voice associated with that person, background music.

MPEG-4 provides a number of such primitive media objects, capable of representing both natural and synthetic content types, which can be either 2- or 3-dimensional. In addition to the media objects mentioned above and shown in FIG. 1, MPEG-4 defines the coded representation of objects such as text and graphics, talking synthetic heads and associated text used to synthesize the speech and animate the head; animated bodies to go with the faces, or synthetic sound.

A media object in its coded form consists of descriptive elements that allow handling the object in an audiovisual scene as well as of associated streaming data, if needed. It is important to note that in its coded form, each media object can be represented independent of its surroundings or background.

The coded representation of media objects is as efficient as possible while taking into account the desired functionalities. Examples of such functionalities are error robustness, easy extraction and editing of an object, or having an object available in a scaleable form.

Composition of Media Objects

FIG. 2 explains the way in which an audiovisual scene in MPEG-4 is described as composed of individual objects. The figure contains compound media objects that group primitive media objects together. Primitive media objects correspond to leaves in the descriptive tree while compound media objects encompass entire sub-trees. As an example: the visual object corresponding to the talking person and the corresponding voice are tied together to form a new compound media object, containing both the aural and visual components of that talking person. Such grouping allows authors to construct complex scenes, and enables consumers to manipulate meaningful (sets of) objects.

More generally, MPEG-4 provides a way to describe a scene, allowing for example to:

place media objects anywhere in a given coordinate system,
  apply transforms to change the geometrical or acoustical appearance of an object,
  group primitive media objects in order to form compound media objects;
  apply streamed data to media objects, in order to modify their attributes (e.g. sound or animation parameters driving a synthetic face);

change, interactively, the user's viewing and listening points anywhere in the scene.

The scene description builds on several concepts from the Virtual Reality Modeling language (VRML) in terms of both its structure and the functionality of object composition nodes.

Description and Synchronization of Streaming Data for Media Objects

Media objects may need streaming data, which is conveyed in one or more elementary streams. An object descriptor identifies all streams associated to one media object. This allows handling hierarchically encoded data as well as the association of meta-information about the content (called 'object content information') and the intellectual property rights associated with it.

Each stream itself is characterized by a set of descriptors for configuration information, e.g., to determine the required decoder resources and the precision of encoded timing information. Furthermore the descriptors may carry hints to the Quality of Service (QoS) it requests for transmission; e.g., maximum bit rate, bit error rate, priority, etc.

Synchronization of elementary streams is achieved through time stamping of individual access units within elementary streams. The synchronization layer manages the identification of such access units and the time stamping. Independent of the media type, this layer allows identification of the type of access unit; e.g., video or audio frames, scene description commands in elementary streams, recovery of the media object's or scene description's time base, and it enables synchronization among them. The syntax of this layer is configurable in a large number of ways, allowing use in a broad spectrum of systems.

Delivery of Streaming Data

The synchronized delivery of streaming information from source to destination, exploiting different QoS as available from the network, is specified in terms of the synchronization layer and a delivery layer containing a two-layer multiplexer.

The first multiplexing layer is managed according to the DMIF specification. (DMIF stands for Delivery Multimedia Integration Framework) This multiplex may be embodied by the MPEG-defined FlexMux tool, which allows grouping of Elementary Streams (ESs) with a low multiplexing overhead. Multiplexing at this layer may be used, for example, to group ES with similar QoS requirements, reduce the number of network connections or the end to end delay.

The "TransMux" (Transport Multiplexing) layer offers transport services matching the requested QoS. Only the interface to this layer is specified by MPEG-4 while the concrete mapping of the data packets and control signaling must be done in collaboration with the bodies that have jurisdiction over the respective transport protocol. Any suitable existing transport protocol stack such as (RTP)/UDP/IP, (AAL5)/ATM, or MPEG-2's Transport Stream over a suitable link layer may become a specific TransMux instance. It is possible to:

Identify access units, transport timestamps and clock reference information and identify data loss.
Optionally interleave data from different elementary streams into FlexMux streams
Convey control information to:
  indicate the required QoS for each elementary stream and FlexMux stream;
  translate such QoS requirements into actual network resources;
  associate elementary streams to media objects
Convey the mapping of elementary streams to FlexMux and TransMux channels.

Interaction with Media Objects

In general, the user observes a scene that is composed following the design of the scene's author. Depending on the degree of freedom allowed by the author, however, the user has the possibility to interact with the scene. Operations a user may be allowed to perform include:

change the viewing/listening point of the scene, e.g. by navigation through a scene;
drag objects in the scene to a different position;
trigger a cascade of events by selecting a specific object, e.g. starting or stopping a video stream;
select the desired language when multiple language tracks are available;

The multimedia content delivery chain encompasses content creation, production, delivery and consumption. To support this, the content has to be identified, described, managed and protected. The transport and delivery of content will occur over a heterogeneous set of terminals and networks within which events will occur and require reporting. Such reporting will include reliable delivery, the management of personal data and preferences taking user privacy into account and the management of (financial) transactions.

The MPEG-21 multimedia framework identifies and defines the key elements needed to support the multimedia delivery chain as described above, the relationships between and the operations supported by them. MPEG-21, MPEG will elaborate the elements by defining the syntax and semantics of their characteristics, such as interfaces to the elements. MPEG-21 will also address the necessary framework functionality, such as the protocols associated with the interfaces, and mechanisms to provide a repository, composition, conformance, etc.

The seven key elements defined in MPEG-21 are:
Digital Item Declaration (a uniform and flexible abstraction and interoperable schema for declaring Digital Items);
Digital Item Identification and Description (a framework for identification and description of any entity regardless of its nature, type or granularity);
Content Handling and Usage (provide interfaces and protocols that enable creation, manipulation, search, access, storage, delivery, and (re)use of content across the content distribution and consumption value chain);
Intellectual Property Management and Protection (the means to enable content to be persistently and reliably managed and protected across a wide range of networks and devices);
Terminals and Networks (the ability to provide interoperable and transparent access to content across networks and terminals);
Content Representation (how the media resources are represented);
Event Reporting (the metrics and interfaces that enable Users to understand precisely the performance of all reportable events within the framework).

Problem

Content and service providers as well as end users demand for remote provisioning (at the providers facilities) of high-quality entertainment services. State-of-the-art video gaming and future virtual reality based applications will generate requirements on high-dynamic, interactive, and high-resolution audio/video. Real-time video/audio processing for electronic gaming and other interactive virtual reality based entertainment requires specialized and performant local resources, e.g. PCs or game consoles.

The problem to be solved by the invention is the provisioning of highly interactive video/audio services for end users, e.g. remote gaming, with reactive requirements and hard real-time conditions. Challenging is the real-time behavior on user commands and a required reactive and a realistic dynamic visualization.

The solution should embed in the existing environment. I.e. remote hosted service, e.g. video games, should be based on the standard broadcast TV distribution concepts and therefore designed additional control path for the user interaction like MHP.

Currently there are no adequate solutions for individual interactive virtual reality services, because the response time seems not to allow realistic dynamic behavior, and the exhaustive motion in the video stream exhausting bandwidth.

Remote hosted simple video games based on the standard broadcast TV distribution path and an additional control path are known, but they provide no adequate solutions for individual interactive services, because the response time does not allow realistic dynamic behavior.

BRIEF DESCRIPTION OF THE INVENTION

The invention provides an Action Streaming Environment for end-users. That is an interactive streaming service and an interaction device enabling the user to interact in a virtual reality.

Simple interaction devices, e.g. a set-top-box, are used to subscribe to and to participate in a personalized interactive streaming service which is provided on a centralized server accessible via a broadband access network.

Action services are individually and interactive, in real time composed audio/video streams, e.g. direct interaction with an avatar, including multi-user virtual environments or realities, e.g. for online gaming or virtual cities in a realistic animation allowing direct user/user and user/environment interaction within the environment.

Hardware Prerequisite

An end-user needs a set-top-box or TV integrated digital audio/video signal handling facilities for receiving TV broadcast and individual channels, e.g. for video on demand. The format used of the remote generated broadband entertainment stream should be compatible with the available digital audio/video signal handling facilities, e.g. MPEG, DVB-MHP compliance.

Functional Requirements

The end-user interaction requires a control channel in the reverse direction. The end-user's equipment sends the stimuli or commands to the entertainment service specific processing elements. Enhancements of the user equipment may be realized by downloading the new functionality including session oriented function downloads driven by the service environment.

The action streaming service will be originated at the remote (central) location by service specific processing elements for generating the audio/video streams for multiple end-users.

Network Requirements

For the individual downstream channel towards the user, guaranties according to bandwidth and service delivery time are required for the operation. The individual control path in the reverse direction primarily must meet especially the delay constraints, in order to keep the user-service-user response time under the perceptible limits. It is essential controlling the access network elements according to the required quality of service parameters. I.e., the service environment generally and/or on a session specific bases has to request the setup of the data paths with the required service quality level at the access network control entities liable for the media stream transport.

OBJECTS AND ADVANTAGES OF THE INVENTION

The invention is a method for generating an interactive virtual reality with real time user interaction for at least one individual user client at a network service using interactive media-streaming technology comprising the steps of establishing an action stream session comprising connection handling between said network service and said client, and comprising quality of service handling, adapting the network environment by demanding network resources and control information in the user's client and participated network elements, establishing a media-streaming path from the service to the client and a user interaction control path in the reverse direction, generating and transmitting individual media streams to the client by embedding interaction into a virtual reality, and extracting and encoding a media stream at the service using a virtual reality description compressed motion picture stream, encoding and transmitting the user's interaction to the service, as well as de-coding and playing the individual media data stream at the client side.

The network environment and the media streaming path might be coordinated between for multiple possibly interacting user clients. The network might be controlled for ensuring the required quality of service and possibly interacting user clients and based on the virtual reality scenario might be coordinated. The quality of service might be especially high data rates in the downstream direction as well as a minimal round trip delay in both directions. This requires a delay minimized encoding of the media stream, e.g. on a frame by frame basis, even for compressed media formats.

The generating of individual media streams by embedding interaction into a virtual reality, and extracting and encoding a media stream at the service using a virtual reality description compressed motion picture stream might be performed by coding parts of the virtual reality description, e.g. as requested by a game application by a hardware independent audio-visual programming interface like Microsoft's DirectX, directly in the outgoing compressed data stream. The media stream might be on the basis of an application oriented graphic and/or sound description information without intermediate uncompressed video information. The action stream session might comprise a compatibility alignment, e.g. by updating and configuring software parts of the service and/or the client by uploading necessary software.

The invention is an action streaming client for generating an interactive virtual reality with real time user interaction using interactive media-streaming technology comprising a downstream interface for receiving interactive media streams, decoding means for viewing interactive media streams, and controlling means for encoding user interaction and demanding network resources, an upstream interface for transmitting the encoded interaction leading to an instantaneous manipulation of the media downstream channel.

The action streaming client might be realized by a device with DSL access enabled digital TV user equipment or it might be realized by an enabled personal computer with DSL access.

The invention is an action streaming server for generating an interactive virtual reality providing a network action streaming service system using intractive media-streaming technology comprising at least one upstream interface for receiving user interaction and at least one downstream interface for providing an interactive media-stream, and for each user an interpreter for the received user interaction, a virtual reality engine for embedding the user interaction in the virtual reality, a media extraction part for extracting an individual media stream, an encoder for encoding the individual media stream, and a session controlling unit for controlling the required quality of service, continuously, and an environment controller for coordinating multiple individual virtual realities, and multiple individual media streams.

The invention is an action streaming service providing resources for generating an interactive virtual reality with real time user interaction using interactive media-streaming technology comprising at least one upstream interface for receiving user interaction and at least one downstream interface for providing an interactive media-stream, and for at least one user sharing a media stream, an interpreter for the received user interaction, a virtual reality engine for embedding the user interaction in the virtual reality, a media extraction part for extracting an individual media stream, an encoder for encoding the individual media stream, and (commonly shared) a session controlling unit for ensuring the required quality of service, continuously, and an environment controller for coordinating multiple individual virtual realities, and multiple individual media streams.

The invention is an action streaming system for generating an interactive virtual reality with real time user interaction using interactive media-streaming technology comprising an access network providing at least one action streaming service system, where said action streaming service system comprises means for generating an interactive virtual reality, at least one action streaming client comprises means for consuming said interactive virtual reality, where said service is located in a network at a action streaming server and said network is controlled said the service.

The invention is an action stream comprising a data structure for encoding, decoding a virtual reality in a media data stream a data structure for embedding interaction, and a control structure for managing network resources ensuring the required quality of service.

The action stream might be realized by a digital video broadcast multimedia home Platform compliant video/audio and control data stream. The action stream might be realized MPEG compliant video/audio and control data stream.

The invention is an action streaming session comprising a connection handling between service and at least one client, a perquisite quality of service handling ensuring that the network provides the required quality of service, and a continuous quality of service handling according to the service's quality of service demands, a compatibility alignment between server and client, a service authentication-authorization-and-accounting, as well as action stream exchange.

The invention is an action streaming protocol comprising means for creating an action streaming service session, means for adaptation of the users' client and the service, means for authentication-authorization-and-accounting, means for controlling network resources according to quality of services demands, and means for coordinating and exchanging action streams.

And the invention are computer software products for generating an interactive virtual reality with real time user interaction using interactive media-streaming technology realizing an action streaming service and an action streaming client.

Accordingly, it is an object and advantage of the present invention to provide novel interactive services for subscribers: gaming, information services, remote-learning, etc. based on emerging virtual reality/worlds technology, i.e. a user-controlled real time composed video stream.

Another advantage of the present invention is that only little equipment is required at the subscriber site in addition to prevalent MPEG aware TV equipment. Especially, there is no need for an expensive video game console and a broad spectrum of pay-per-use games.

A further advantage of the present invention is that it is multimedia home platform (DVB-MHP) compliant. Broadband entertainment is expected to be the future of the business of service providers. And the inventions uses the broadband infrastructure enabling a shared resource, i.e. an action service with the relatively low cost of an individual broadband access.

These and many other objects and advantages of the present invention will become apparent to those of ordinary skill in the art from a consideration of the drawings and ensuing description.

BRIEF DESCRIPTION OF THE FIGURES

FIG. 1 illustrates a prior art combination of the three main types of picture decomposition used in MPEG-1.

FIG. 2 shows a prior art MPEG scene description which builds on several concepts from the Virtual Reality Modeling Language in terms of both its structure and the functionality of object composition nodes.

DETAILED DESCRIPTION OF THE INVENTION

Figure 3:
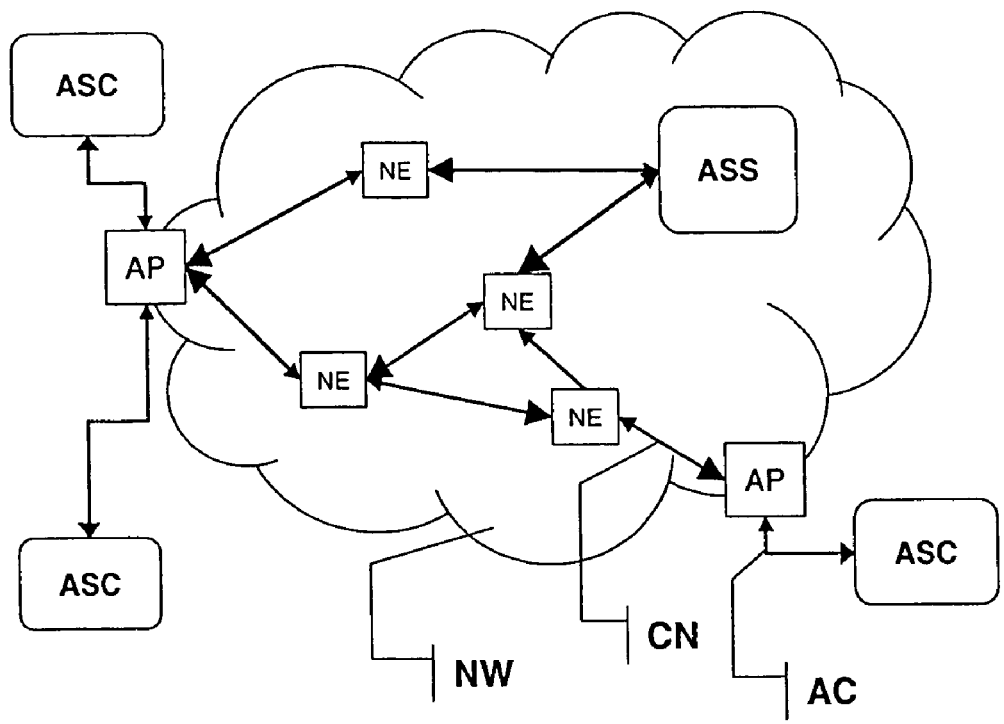
FIG. 3 is a schematic drawing of the networking context of an action streaming environment with the components according to the invention.

Those of ordinary skill in the art will realize that the following description of the present invention is illustrative only and is not intended to be in any way limiting. Other embodiments of the invention will readily suggest themselves to such skilled persons from an examination of the disclosure.

FIG. 1 shows a sequence SEQ of pictures with a consecutive sub-sequence or group GRP of pictures. It shows a single picture PIC comprising a horizontal slice SLC, consisting of blocks. It further shows a macroblock MBC consisting of multiple blocks and a single block BLC.

The drawing illustrates main types of picture decomposition used in MPEG-1. In a continuous picture sequence SEQ only the varying parts carry information. To extract and identify these parts a picture sequence SEQ is decomposed into groups GRP and a picture PIC is decomposed into slices SLC, macroblocks MBC and blocks BLC. This fact is heavily used to save network and memory resources when transmitting or storing video data.

FIG. 2 shows a prior art MPEG scene description which builds on several concepts from the Virtual Reality Modeling Language in terms of both its structure and the functionality of object composition nodes. The drawing contains a virtual reality consisting of 2- and 3-dimensional audio visual objects OBJ originated and controlled by a multiplexed downstream DS and streamed into an encoded multiplexed upstream US. The scene comprises a coordinate system CS, and the audio visual objects OBJ in the space generated by the scene coordinate system CS are projected onto a projection plane PP with respect to a hypothetical viewer VW. Video information VI is extracted with respect to this projection and audio information AU is extracted correspondingly by integrating the audio objects into a so called psycho acoustic model.

The drawing illustrates how a virtual reality consisting of audio visual objects can be manipulated object-wise by streamed control data DS, how these objects origin streamed control data US, and how audio streams AU and video streams VI could be derived. Note that the object-wise presentation of the virtual reality is natural and enables a tight encoding.

FIG. 3 shows a schematic drawing of the networking context of the invention. It contains a network NW consisting of network access points AP, e.g. an network access server and network elements NE, e.g. switches, routers, gateways, etc. Furthermore the network comprises an action streaming service system provided by an action streaming server ASS. The network elements including the action streaming server and the network access points are inter-connected by means of network connection paths or channels CN, illustrated by the arrows. The network access points APs provide action streaming clients ASCs access to the network NW via an access line AC, e.g. digital subscriber line (DSL), illustrated by thin arrows.

The thick end of the arrows depicting the channels CN modeling a (broadband) downstream carrying media information of a virtual world generated by the action streaming service, and the thin ends modeling the upstream carrying user interactions originated by the action streaming clients ASC. The action streaming service ASS controls the network elements by demanding necessary quality of services and indirectly defining connection paths CN ensuring a high-quality interactive virtual reality at the action streaming clients. Downstream and upstream data may be routed on different paths to and from an ASC. Network controlling connections might be routed on different paths, too.

Figure 4:
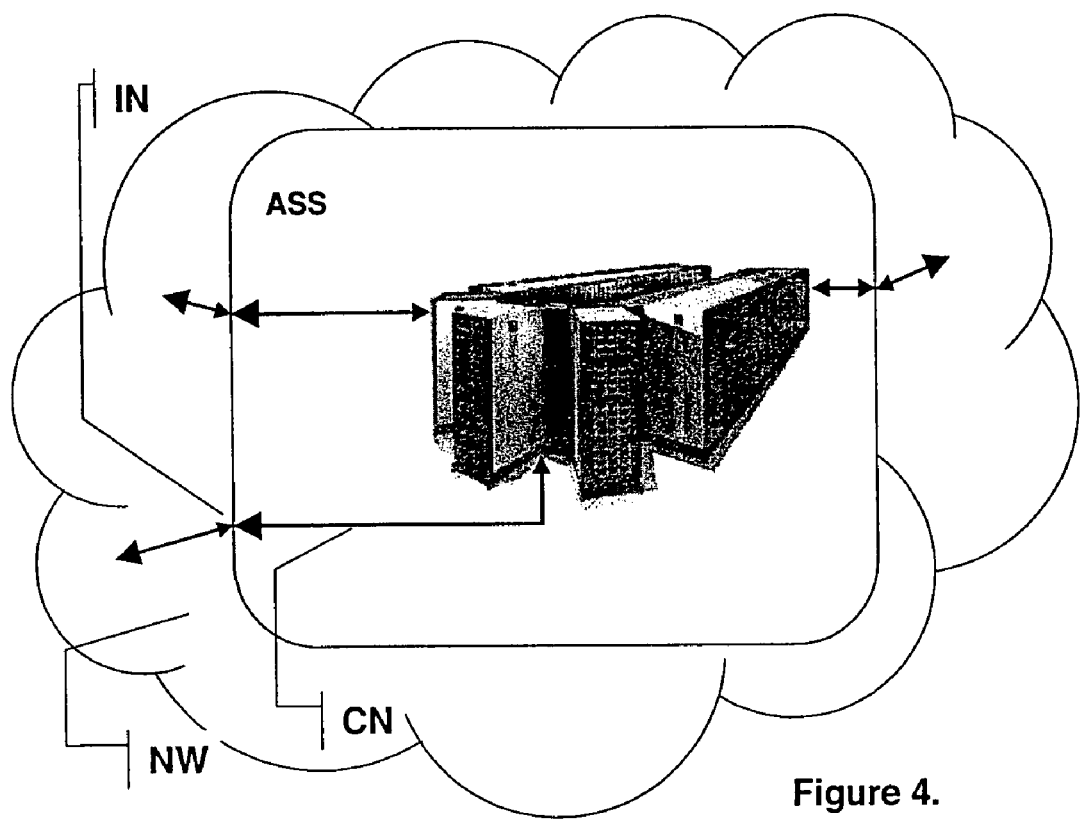
FIG. 4 is a drawing of an action streaming server according to the invention.

FIG. 4 is a drawing of an action streaming server ASS. It shows a network channel interface IN the network NW (environment), as well as a drawing of a computer cluster providing the virtual realities and the corresponding video and audio streams for a plurality of action streaming clients (generic supercomputer for visualization applications or computer blades based on game console technology).

Figure 5:
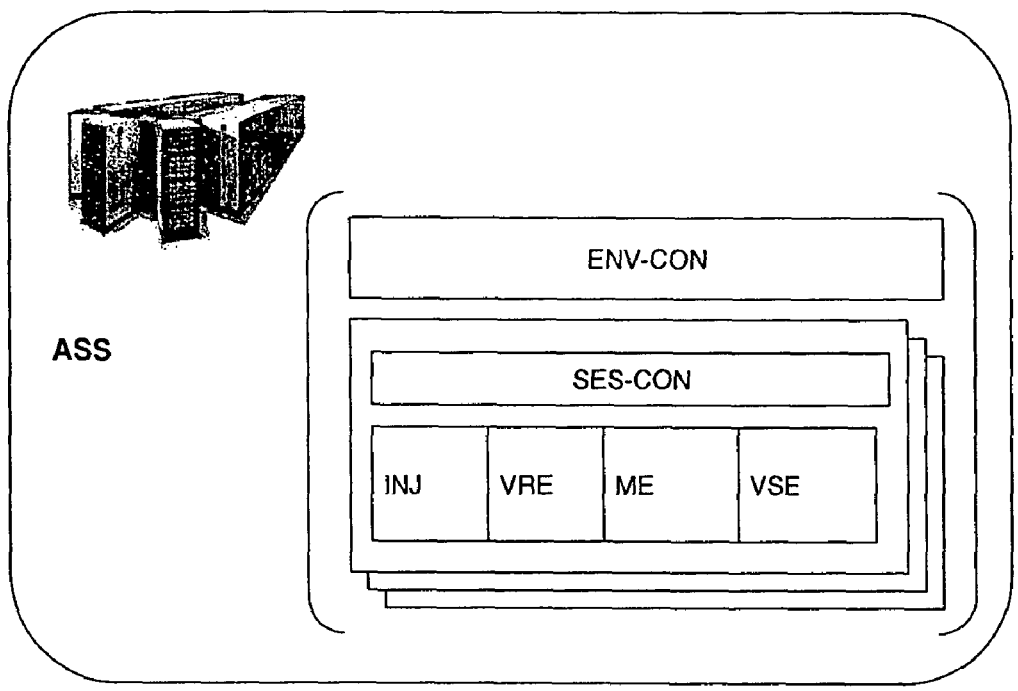
FIG. 5 is a schematic drawing of the architecture of the action streaming server according to the invention.

FIG. 5 is a schematic drawing of the architecture of an action streaming service system provided on an action streaming server. It shows a service environment and network controller ENV_CON and a plurality of session controller SES-CON managing a quadruple of units, a stimuli injection unit INJ, a virtual reality engine VRE, a media extraction unit ME, and a video streaming encoding unit VSE.

The service environment and network controller ENV_CON controls the service environment comprising of coordinating multiple, maybe one common shared, virtual realities. It controls the session interaction comprising all shown units INJ, VRE, ME, VSE with respect to performed actions. Multi-player environments can be implemented either tight or lose coupled, i.e. all users sharing the same session or a session per user coupled by inter-session communication. It has to take into account the desirable, granted, and available quality of services or network resources using e.g., common video streams and broadcasting or balancing the load of the single session processors. It could be even advantageous to allocate certain action processing to an action streaming client. Such a concept is closely linked with the audio-visual coding standard used, e.g. in contrast to the mainly video oriented MPEG-1 and -2 standards MPEG-4 offers flexible combinable media objects.

The session controller SES-CON is responsible, e.g. for authentication-authorization-and-accounting tasks, for connection setup, for the choice of the virtual reality, for the client-service alignment, etc. It is the controlling instance of the provided action stream.

The action stream is generated by the four logical processing units, named stimuli injection INJ, virtual reality engine VRE, media extraction ME, and video stream encoding. The stimuli injection INJ receives the users interaction from the network and translates it for the virtual reality engine. The virtual reality engine VRE creates continuously new states based on the state history and the stimuli injections. This timed scene is called virtual reality or virtual world. It can consist of buildings, tools, backgrounds, a garden, streets, a play ground, a star ship, a compass, or any audio visual object. It even can comprise the user simulated himself. It can provide state information and feedback, e.g. force feedback for a joystick, a visual impression, e.g. a video, sound, or any reactivity in general. The view for the subscribed action streaming client is extracted from virtual reality model by the media extraction ME. And it is encoded into media/command stream by the video stream encoding VSE. The drawing illustrates for simplicity reasons only the video encoding although all media could be encoded analogously.

The action streaming service system ASS might comprise hardware implemented algorithms for the direct generation of the compressed media stream from an application oriented graphic and/or sound description information, thus avoiding an intermediate uncompressed video information as generated by ordinary visual processors (3D graphics accelerators).

Figure 6:
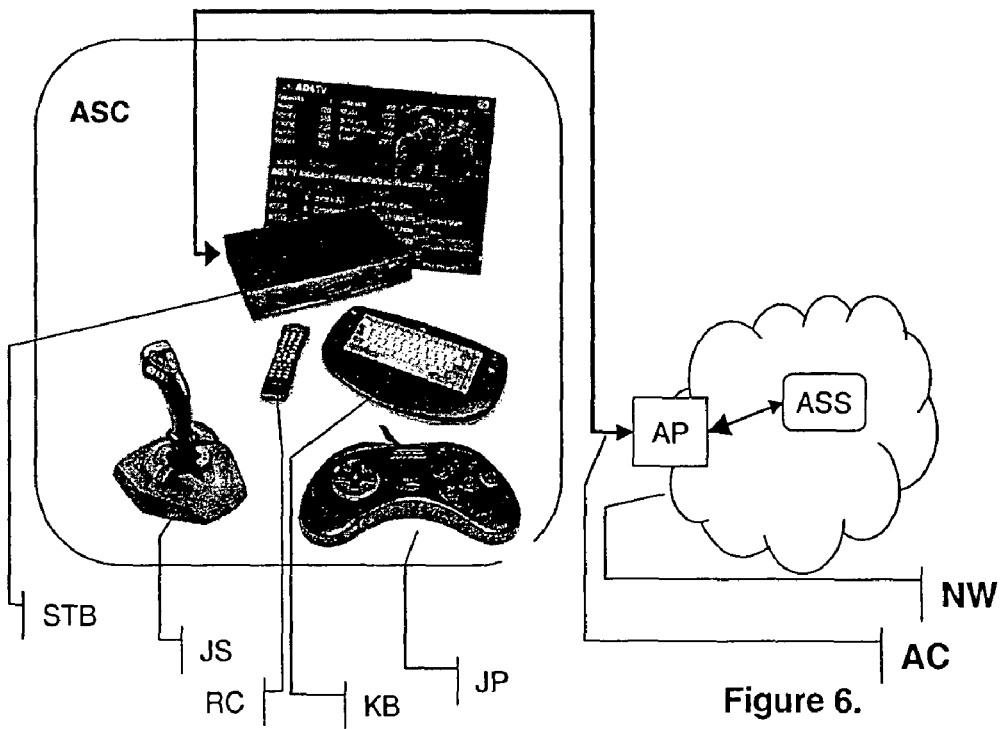
FIG. 6 is a drawing of an action streaming client according to the invention.

FIG. 6 is a drawing of an action streaming client ASC comprising several input devices, here a joystick JS a remote control RC a keyboard KB and a joypad JP. The client himself is realized by a set-top box STB. The set-top box has an interface connection AC to a network access point, e.g., a digital subscriber line, providing access to the network NW.

The drawing illustrates the idea of a very simple and cheap (compared with a complex expensive high tech game console like a play station or a game cube) customer premises equipment, reusing a television set. The action streaming client realizing device implementing a DSL access enabled digital TV user equipment might be integrated in a next generation TV set instead of being a set-top box.

Alternatively customers using standard PC equipment can get on-demand access to the whole set of recent games, without the need to invest permanently in the top end of graphics accelerators and CPU technology.

Figure 7:
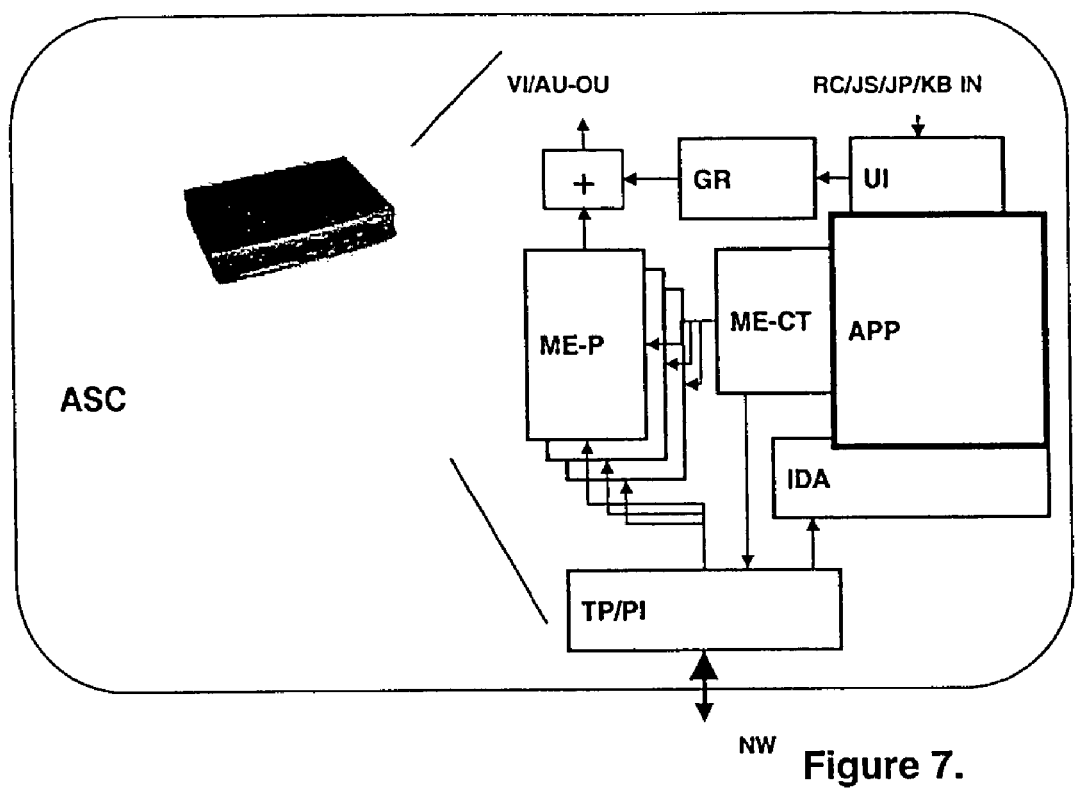
FIG. 7 is a schematic drawing of the architecture of the action streaming client according to the invention.

FIG. 7 is a schematic drawing of the architecture of the action streaming client ASC. The action streaming client ASC comprising a transport protocol and physical interface TP/PI to the network NW, it comprises a plurality of media players ME-P and a graphics unit GR. It comprises a user interaction unit UI, managing remote control RC keyboard KB joypad JP, joystick JS, etc. input IN. The graphics and the media player provide video VI, audio AU, etc. output OU. The media player are coordinated by a media control unit ME-CT for aligning and synchronizing the multi-media. Further, the architecture comprises an information and data access IDA. In the center of these components an application APP is embedded using, instructing and coordinating said components.

Operationally the action streaming client receives from the network NW media streams using a physical interface Pi and a transport protocol TP, commands for the running action streaming application APP is provided via information and data access. The application might coordinate the media streams via the media control ME-CT.

User interaction from human user interface devices are provided to the application APP via the user interaction component UI. This architecture is similar to the multi media home platform.

Future applications for end users will comprise a novel class of highly interactive virtual reality applications. Action services are individually and interactive, in real time composed media streams, e.g. direct interaction with an avatar including multi-user virtual environments, e.g., for online gaming or virtual cities in a realistic animation allowing direct user/user and user/machine interaction.

An end-user needs no complex equipment with a high technology drive, only a set-top-box or TV integrated digital audio/video signal handling facilities for receiving TV broadcast channels. The format used for transmitting the remote generated broadband entertainment stream should be compatible with the available digital audio/video signal handling facilities, e.g. using a MPEG (Motion Pictures Expert Group) family standard format compliant with the Multimedia Home Platform. The end-user interaction requires a channel in the reverse direction. The end-user equipment converts the stimuli/commands derived from human interfaces to an action stream service control protocol data flow. Enhancements of the user equipment may be realized by downloading the new functionality including session oriented function downloads driven by the service environment.

The action streaming service will be originated at a remote (central) location by service specific processing elements for generating the media streams for multiple end-users. The information derived from the media processing function block has to be converted/encoded by adaptation means into the downstream digital media signal as required by the user equipment. This might be done on a delay minimized frame by frame basis, even for compressed video formats. An efficient way generating the output stream seems the direct translation of the description format for the audiovisual effects as used by the application defined within the service environment/operating system as application programming interface into the coding of the media stream.

Input for the (inter-)action streaming respectively entertainment service generation is the service control protocol relaying the user stimuli. Adaptation here means terminating the control protocol and emulating local input/steering means support the porting of, e.g. gaming, applications designed for the local usage.

The action streaming technology makes high demands on the access network between user and the location of the service origination. For the individual downstream channel towards the user, guaranties according to bandwidth and service delivery time are required for the operation. The individual control path in the reverse direction primarily must meet especially the delay constraints, in order to keep the user-service-user response time under the perceptible limits. Complying these network related quality of service parameters is advantageous for the service quality and finally the service acceptance. The access network elements realizing the data paths must be controlled according to the required quality of service parameters. Action streaming quality of service requirements have to be requested/controlled (generally and/or user session specific) by the service environment, e.g. using an access network data path control.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of skill in the art after perusal of this application.

Alternatively, the invention can be used with any type of media and enabled action streaming client. In the future it is expected to have devices stimulating more senses more perfect, e.g. having hologram projectors, aura generators, wearable suits providing impressions like temperature, pressure, or vibration to a user's sense of touch.

The invention, therefore, is not intended to be limited to audio or video except in the spirit of the appended claims.

What is claimed is:

1. A method for generating an interactive individual virtual reality using at least one action streaming client (ASC) and a network action streaming server (ASS), wherein the ASC and the ASS exchange data using interactive media streaming, the method comprising:
    establishing an action stream session comprising connection handling between the ASS and the ASC, and quality of service handling;
    adapting a network environment comprising the ASS, the ASC and at least one network element by demanding network resources and control information in the ASC and the network element;
    establishing a media streaming path from the ASS to the ASC and a control path for a user interaction from the ASC to the ASS;
    generating and transmitting an individual media stream to the ASC by embedding, at the ASS, the user interaction input at the ASC into a virtual reality generated at the ASS, and extracting and encoding a media stream corresponding to the virtual reality at the ASS using a virtual reality description compressed into a motion picture stream; and
    encoding and transmitting the user interaction to the ASS, and decoding and playing the individual media stream at the ASC.

2. The method according to claim 1, where said network environment and said media streaming path are coordinated for multiple ASCs.

3. The method according to claim 1, further comprising controlling the network environment for controlling a required quality of service continuously.

4. The method according to claim 3, where said controlling the network environment for ensuring the required quality of service is coordinated between multiple ASCs and based on a scenario with respect to the virtual reality.

5. The method according to claim 3, where said quality of service is especially high data rates in a downstream direction from the ASS to the ASC as well as a minimal round trip delay and/or minimal delay variation in both directions between the ASS and the ASC.

6. The method according to claim 1, where said generating the individual media stream by embedding the user interaction into the virtual reality, and said extracting and encoding the media stream at the ASS using the virtual reality description compressed into the motion picture stream is performed by coding parts of the virtual reality description directly in an outgoing compressed data stream.

7. The method according to claim 1, where said media stream is on a basis of an application oriented graphic and/or sound description information without intermediate uncompressed video information.

8. The method according to claim 1, where said action stream session comprising a compatibility alignment by updating and configuring software parts of the ASS and/or the ASC by uploading software.

9. An action streaming system for providing an action streaming service for a real time user interaction using interactive media streaming, the system comprising a network providing at least one action streaming service server (ASS) and at least one action streaming client (ASC), wherein the ASS and the ASC exchange data using interactive media streaming, wherein the ASS comprises means for generating a virtual reality, and the ASC comprises means for consuming said interactive virtual reality, wherein the action streaming service is provided by the ASS and said network is controlled by the action streaming service, and wherein the action streaming service comprises an individual media stream generated at the ASS and transmitted to the ASC by embedding, at the ASS, the real time user interaction input at the ASC into the virtual reality generated at the ASS, and the ASS extracts and encodes a media stream corresponding to the virtual reality using a virtual reality description compressed into a motion picture stream.

* * * * *